(12) United States Patent
Parnapy et al.

(10) Patent No.: US 7,748,986 B1
(45) Date of Patent: Jul. 6, 2010

(54) END OF CAR JUNCTION BOX ASSEMBLY

(75) Inventors: Keith Parnapy, North Bangor, NY (US);
Steven Newton, Adams, NY (US);
Bryan M. McLaughlin, Watertown, NY (US); Anthony Lumbis, Watertown, NY (US); Patrick Storms, Carthage, NY (US); Gary Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 17 days.

(21) Appl. No.: 12/350,545

(22) Filed: Jan. 8, 2009

(51) Int. Cl.
*H01R 33/00* (2006.01)
(52) U.S. Cl. .......................... 439/34; 439/559
(58) Field of Classification Search .................. 439/34, 439/35, 76.2, 559, 598
See application file for complete search history.

(56) References Cited

U.S. PATENT DOCUMENTS

| 6,056,599 A | * | 5/2000 | Flickinger et al. | 439/598 |
| 6,283,765 B1 | | 9/2001 | Lumbis et al. | 439/35 |
| 6,669,506 B2 | | 12/2003 | Newton | 439/559 |

* cited by examiner

*Primary Examiner*—Javaid Nasri
(74) *Attorney, Agent, or Firm*—Barnes & Thornburg LLP

(57) ABSTRACT

An End of Car (EOC) junction box assembly includes a housing wherein a plurality of female/female contact sockets couple with a corresponding plurality of male contact pins and are positioned by a fitting that enables the female/female contact sockets to interface with an EOC receptacle plug also included in the housing body, such that alternate positions of the fitting and EOC receptacle plug are available during assembly while the components included in the housing body are restrained from rotation following assembly.

19 Claims, 8 Drawing Sheets

END OF CAR JUNCTION BOX ASSEMBLY

The present invention relates generally to junction boxes assemblies and, more specifically, for an improved End of Car junction box for the electrical trainline of a train, as specified in the independent claims.

BACKGROUND OF THE INVENTION

Trains, in general, and freight trains, in particular, have pneumatic brakes. Trains include a plurality of cars interconnected to each other and pulled by a locomotive or include their own locomotion within one of the cars. At least one fluid pipe interconnects each of the cars. In trains that have electrical capability, a trainline is interconnected between each of the cars and/or locomotive.

Conventionally, a junction box assembly is generally provided at each end of the rail car or locomotive. Conventionally, the electrical cable line within the rail car is connected at a terminal block within the junction box. An electrical connector receptacle is also provided in the junction box and connected to the terminal block. The cable is then received in the connector/receptacle to interconnect between a pair of cars. An example of a terminal block for an electrically-controlled pneumatic brake application is illustrated in U.S. Pat. No. 6,283,765. A conventional junction box for use on the end of the car or locomotive is illustrated in U.S. Pat. No. 6,669,506.

In recent years, End Of Car ("EOC") connectors have been standardized; in particular, in freight cars, EOC connectors have been standardized by the American Association of Railroads. Such connectors threadably receive the trainline cable for a rail car. As disclosed in U.S. Pat. No. 6,669,506, conventional connectors can be susceptible to rotation during connection and disconnection. This rotation in combination with the inability to create a seal where the EOC connector extends through the wall of the housing is very detrimental to the EOC connectors because components included in the EOC junction box assemblies can become tangled or damaged, thereby resulting in durability and reliability issues. Thus, U.S. Pat. No. 6,669,506 addresses such issues.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with illustrated embodiments, an EOC junction box assembly includes a housing wherein a plurality of female/female contact sockets couple with a corresponding plurality of male contact pins and are positioned with the aid of a fitting such that the female/female contact sockets interface with an EOC receptacle plug also included in the housing, such that alternate positions of the fitting and EOC receptacle plug are available during assembly while the components included in the housing are restrained from rotation following assembly.

These illustrated embodiments are achieved by a combination of features recited in the independent claim. Accordingly, dependent claims prescribe further detailed implementations of the present invention.

These and other aspects of the present invention will become apparent from the following detailed description of the invention, when considered in conjunction with accompanying drawings.

BRIEF DESCRIPTION OF THE DRAWINGS

Various embodiments are described herein, by way of example only, with reference to the accompanying drawings. With specific reference now to the drawings, it should be understood that the particulars shown are by way of example and for purposes of discussion of illustrated embodiments only, and are presented in order to provide what is believed to be a useful and readily understood description of the principles and concepts of the invention. In this regard, no attempt is made to show structural details of the invention in more detail than is necessary for a fundamental understanding of the invention, the description taken with the drawings making apparent to those skilled in the art how the several forms of the invention may be embodied in practice.

Accordingly, a more complete understanding of the present invention and the utility thereof may be acquired by referring to the following description in consideration of the accompanying drawings, in which like reference numbers indicate like features, and wherein.

DETAILED DESCRIPTION OF THE INVENTION

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 3:
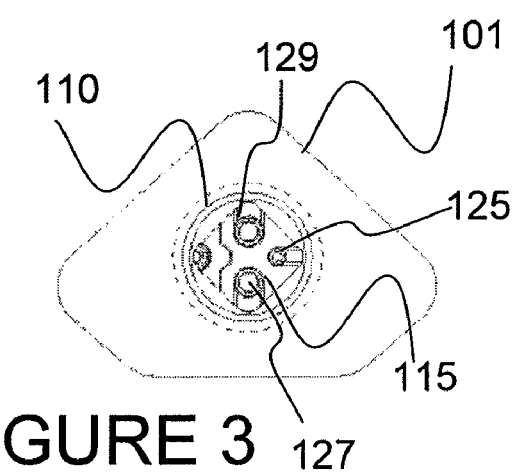
FIG. 3 is an end view of an end opposite to the end illustrated in FIG. 2 of the EOC junction box assembly illustrated in FIG. 1.
Figure 4:
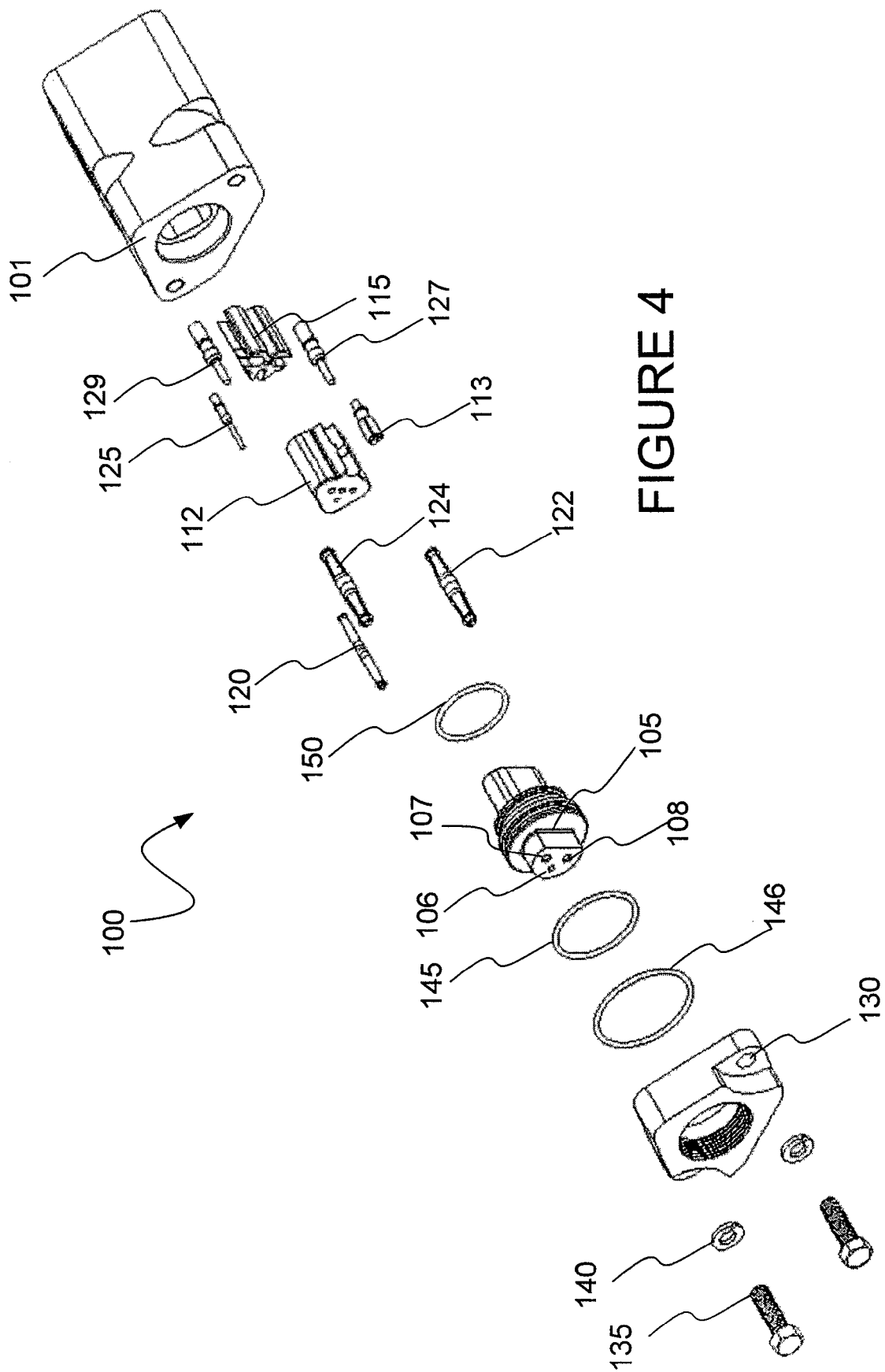
FIG. 4 is an exploded view of an EOC junction box assembly incorporating the principles of the present invention.

An EOC junction box assembly for a trainline on the prior art is illustrated in FIGS. 3 and 4 of U.S. Pat. No. 6,669,506. As illustrated there, the assembly addresses conventional problems of rotation and the inability to make a seal. In that configuration, the housing of such EOC junction box assemblies may include a removable lid and a pair of opposed walls. A terminal block is mounted in the interior of the housing. Fastener apertures are provided adjacent to the corners of the walls of the housing and through which fasteners extend and mount the housing to the car. Further, fasteners secure the lid to the body of the EOC junction box and a fitting includes a threaded sleeve, which secures the fitting in an opening in the side wall of the body. Additionally, the interior of the body includes numerous components including screws, nuts, a strain relief, and various collars and fasteners so that a car trainline wire cable can be received through the body and its wires connected to the terminal block so as to provide a conventional EOC junction box.

However, although such conventional connectors are less susceptible to rotation during connection and disconnection and there is improved ability to create a seal where the EOC connector extends through the wall of the housing, such connectors still suffer from very complicated structures that involve numerous components that require complicated assembly. As a result, even though such designs improve durability and reliability, the installation and maintenance of such designs can be burdensome. Thus, simplification of the components included in an EOC junction box assembly should improve durability and reduce the possibility of malfunction or damage of the constituent parts of the EOC junction box assembly.

Accordingly, illustrated embodiments of the invention provide improved ease of assembly and repair by providing an EOC junction box configured to act as a plug and play type of apparatus whereas conventional EOC junction box required assembly of terminal strips and many small pieces of associated hardware. Further, illustrated embodiments provide the opportunity to provide alternative configurations wherein the EOC receptacle plug, along with the EOC fitting, may be rotated at 90 degree intervals. The ability to rotate these internal components allows for alternate mounting positions for the EOC junction box to be mounted to the housing of the car without the need to change the orientation of the trainline cable.

Moreover, illustrated embodiments address the conventional need to carefully mate the EOC receptacle plug to the cover because the novel EOC junction box includes a step that the EOC receptacle plug may rest against rather than using threads for placement.

Figure 1:
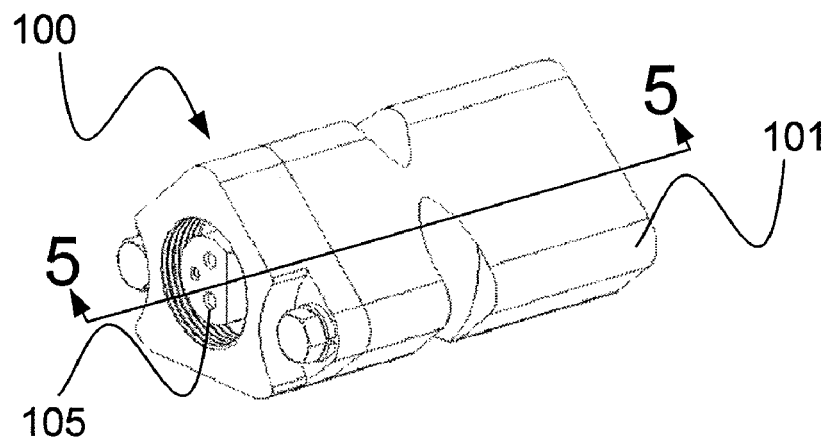
FIG. 1 is a perspective view of an EOC junction box assembly incorporating the principles of the present invention.

FIG. 1 is a perspective view of an EOC junction box assembly 100 incorporating the principles of the present invention. As indicated in the perspective view of the EOC junction box assembly, the EOC junction box assembly 100 includes both a triangular shaped EOC junction box housing 101 as well as an EOC receptacle plug 105 provided on one longitudinal end of the EOC junction box housing 101, as further illustrated in FIG. 2.

Figure 2:
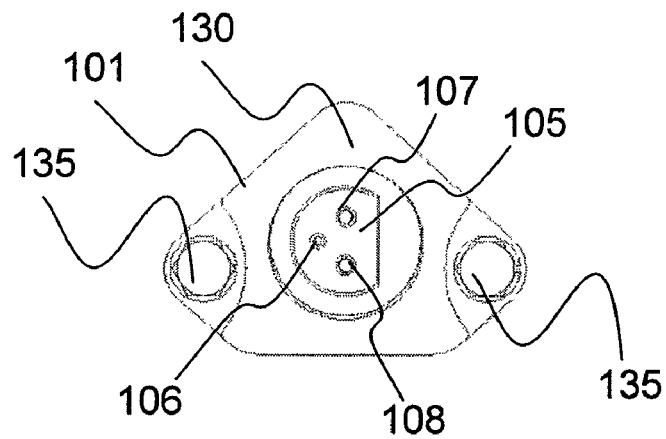
FIG. 2 is an end view of one end of the EOC junction box assembly illustrated in FIG. 1.

As illustrated in FIG. 2, the longitudinal end including the cable EOC receptacle plug 105 also includes an EOC junction box housing cover 130 as well as two bolts that engage with both apertures in the EOC junction box cover 130 and threaded apertures included in the EOC junction box housing 101 so as to affix the EOC junction box cover 130 to the EOC junction box housing 101 and position the EOC receptacle plug 105 within the EOC junction box assembly 100 so as to be accessible for connection and disconnection by personnel. The EOC receptacle plug 105 includes a plurality of apertures of differing sizes 106-108 that mate with corresponding male pins affixed to an end of a trainline or cable (not shown) as conventionally known. As shown in FIGS. 1 and 2, the EOC receptacle plug 105 has a "D" shape that is conventionally known to help enable connection and disconnection of such cables without rotation of components or connections included in EOC boxes. Therefore, it should be understood and appreciated that the both the "D" shape and the differing sizes of the apertures 106-108 assist in enabling personnel to easily connect and disconnect lines to the EOC receptacle plug 105 in a proper orientation.

As illustrated in FIG. 3, a longitudinal end of the EOC junction box housing 101 opposite to that illustrated in FIG. 2 may include a threaded aperture 110 that is configured to mate with a corresponding threaded component provided as part of a rail car to which the EOC junction box assembly 100 is to be coupled. Like FIG. 2, the opposite end of the EOC junction box housing 101 includes a plurality of apertures of differing sizes 125, 127, 129 positioned in a similar manner to that of FIG. 2, however with a modified-square shape, which is provided by EOC fitting 115, which may be rotated to provide various alternative positions, as explained in detail herein.

FIG. 4 is an exploded view of an EOC junction box assembly 100 illustrated in FIG. 1. As illustrated in FIG. 4, the EOC junction box housing 101 houses various assembly components that cooperate in a manner so as to provide electrical connection between one longitudinal end of the assembly (as illustrated in FIG. 2, for example) and an opposite longitudinal end of the assembly (as illustrated in FIG. 3, for example). Accordingly, the EOC junction box assembly 100 includes an EOC fitting 115 that cooperates and mates with a plurality of male contact pins 125, 127 and 129 (as illustrated in FIG. 3), that in turn mate with a corresponding plurality of female/female contact sockets 120, 122, 124; note that both the male contact pins and the female/female contact sockets vary in size and, therefore, form corresponding pairs of male contact pins and female/female contact sockets.

Figure 11:
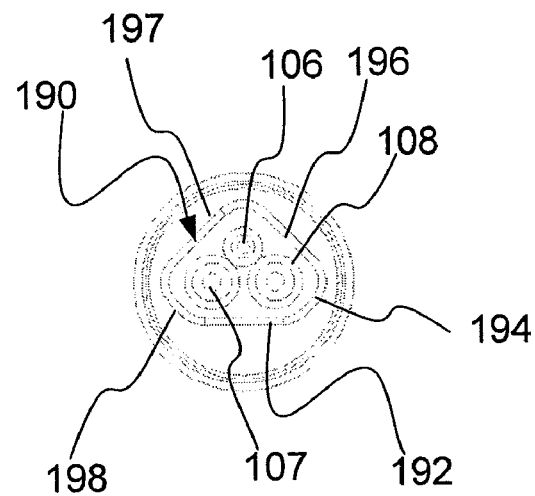
FIG. 11 illustrates an end view of the EOC receptacle plug illustrated in FIG. 9.

In turn, the female/female contact sockets 120, 122, 124 interact with the rear end 190 of the EOC receptacle plug 105 (as illustrated in FIG. 11) so as to provide electrical contact from the EOC receptacle plug 105 through to the male contact pins 125, 127, 129.

Figure 8:
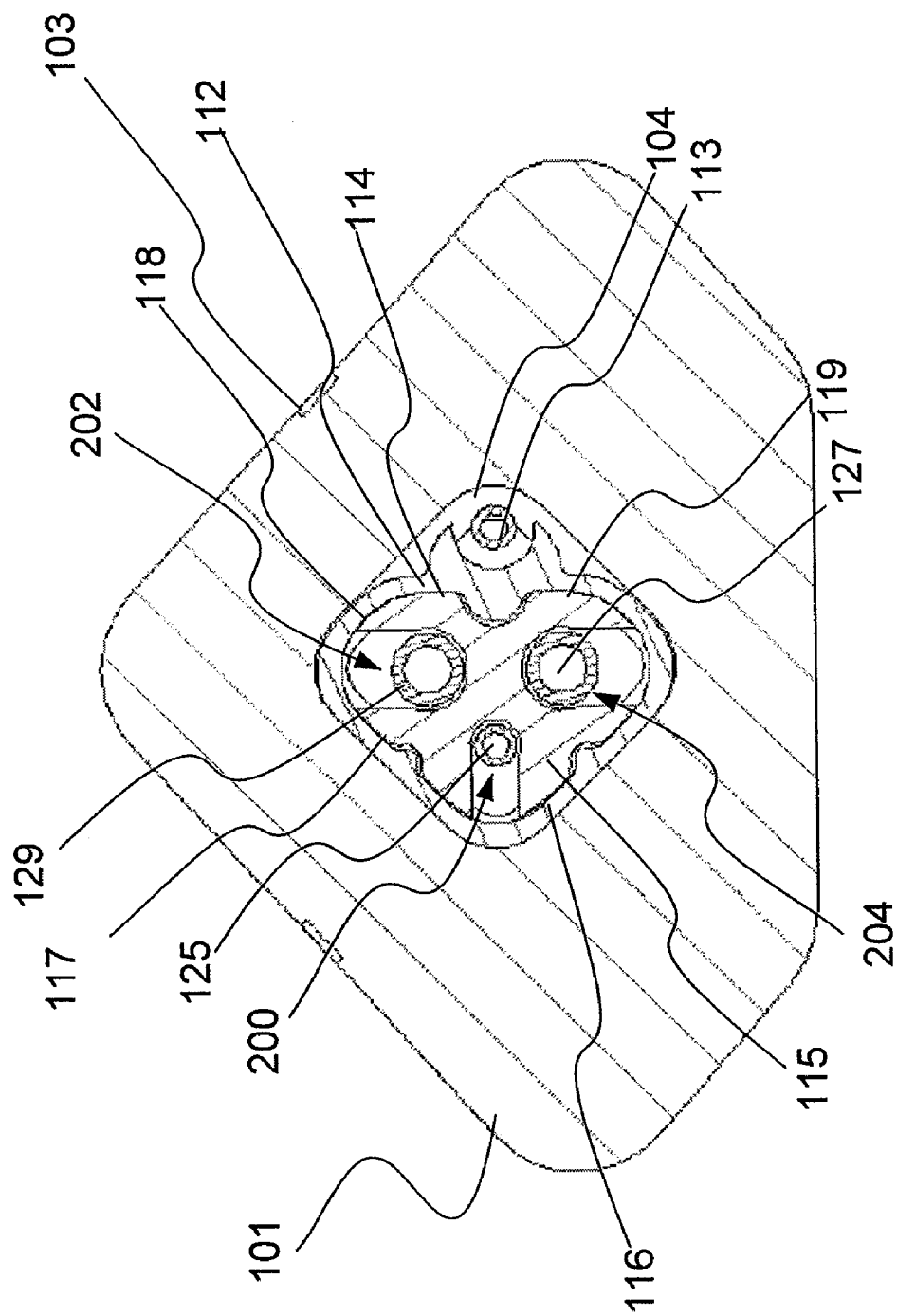
FIG. 8 is a lateral cross section view of the EOC junction box assembly illustrated in FIG. 5 when viewed along the view line 8-8 of FIG. 5.
Figure 9:
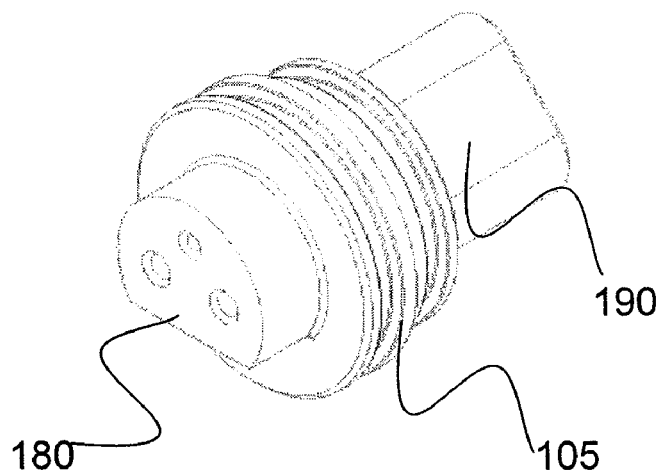
FIG. 9 illustrates a perspective view of an EOC receptacle plug utilized in the EOC junction box assembly illustrated in FIG. 1.

The EOC receptacle plug 105 cooperates with an EOC junction box cover 130, which has a configuration that is described herein with reference to FIG. 9. As part of the assembly of the EOC junction box assembly 100, the EOC junction box cover 130 is affixed over the EOC receptacle plug 105 to the EOC junction box housing 101 using a plurality of bolts 135 with associated washers 140 through apertures included in the EOC junction box cover 130 to engage with threaded apertures in the EOC junction box housing 101. To provide durability and provide a weather-resistant seal, the EOC junction box assembly 100 may also include seals 145, 146 and 150. As explained herein with reference to FIGS. 5-8 and 12-13, the unique shape of the EOC fitting 115 and its interaction with the sleeve 112, ground pin 113 and interior shape of the EOC junction box housing 101 and the male contact pins 125, 127, 129 enables the EOC receptacle plug 105 to be positioned in various alternative positions as part of assembly of the EOC junction box assembly 100; however, the resulting EOC junction box assembly 100 does not suffer from operation and maintenance issues stemming from rotation of the EOC receptacle plug 105 during coupling and uncoupling of the EOC junction box assembly 100 (for the reasons explained with reference to FIGS. 9-11).

Figure 5:
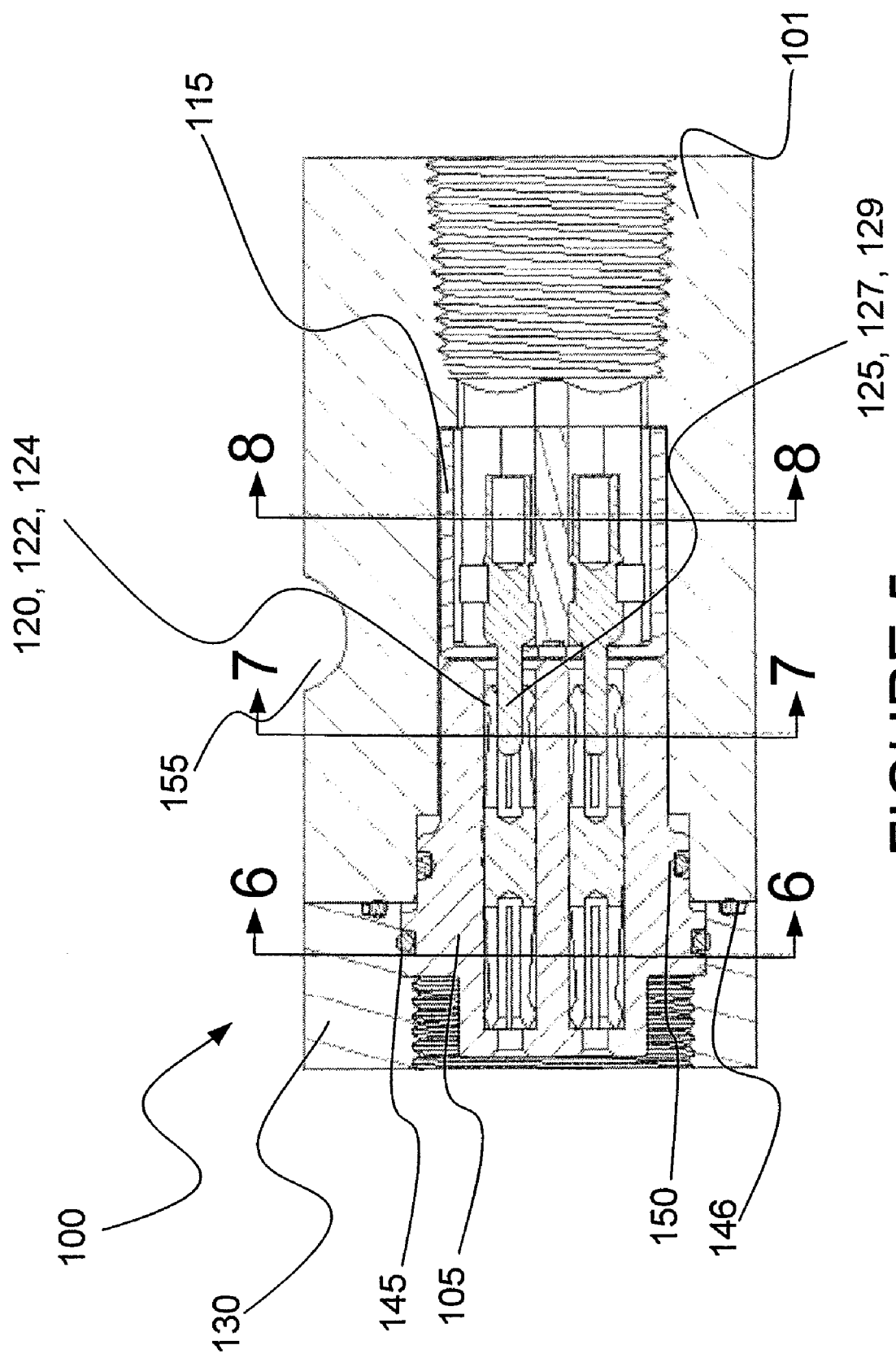
FIG. 5 is a longitudinal cross section view of the EOC junction box assembly illustrated in FIG. 1 when viewed along the view line 5-5 of FIG. 1.

FIG. 5 is a longitudinal cross section view of the EOC junction box assembly illustrated in FIG. 1 when viewed along the view line 5-5 of FIG. 1. As illustrated in FIG. 5, the various components illustrated in the exploded view of FIG. 4 are inserted and cooperate within the EOC junction box housing 101. Thus, the EOC junction box housing 101 includes the EOC fitting 115 cooperating with the male contact pins 125, 127, 129, which in turn cooperate with the female/female contact sockets 120, 122, 124, which in turn cooperate with the apertures included on the back/internal side 190 of the EOC receptacle plug 105. Accordingly, the cross section of FIG. 5 illustrates how, once these components are inserted in the interior of the EOC junction box housing 101, the seals 145, 146 and 150 are installed and the EOC junction box cover 130 is affixed to the EOC junction box housing 101 to both seal that side of the interior of the EOC junction box housing 101 and position the EOC receptacle plug 105 using the bolts 135. In both FIGS. 1 and 5, u-bolt pocket 155 is provided. The pocket 155 bisects the corners of the triangular shape of the EOC junction box housing 101 and is primarily used to assist in facilitating coupling and uncoupling of the EOC junction box assembly 100 with exterior equipment but may also be used to aid in mounting the EOC junction box assembly 100.

Figure 6:
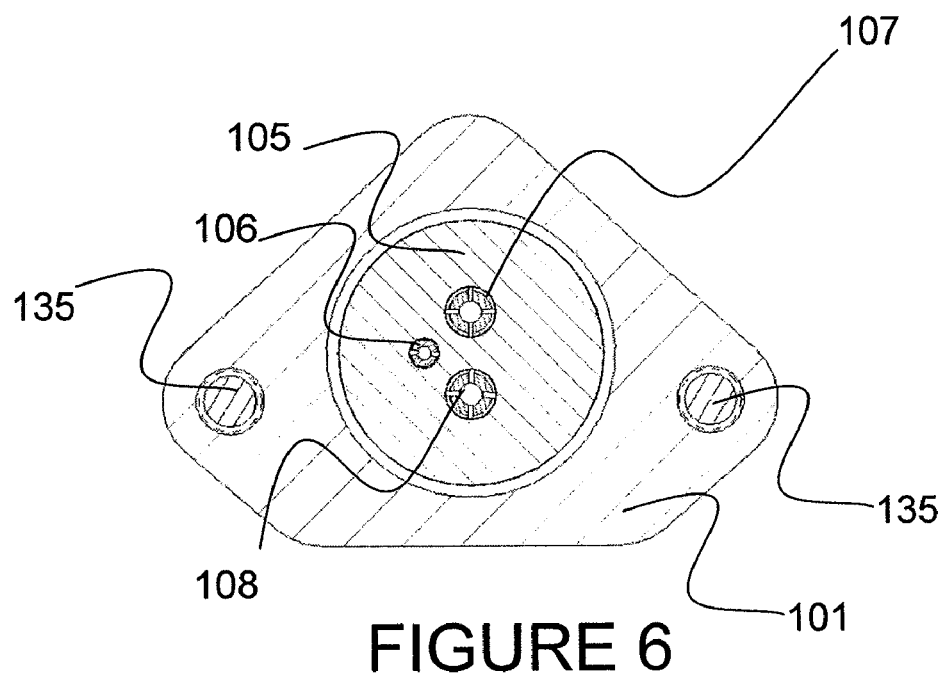
FIG. 6 is a lateral cross section view of the EOC junction box assembly illustrated in FIG. 5 when viewed along the view line 6-6 of FIG. 5.
Figure 7:
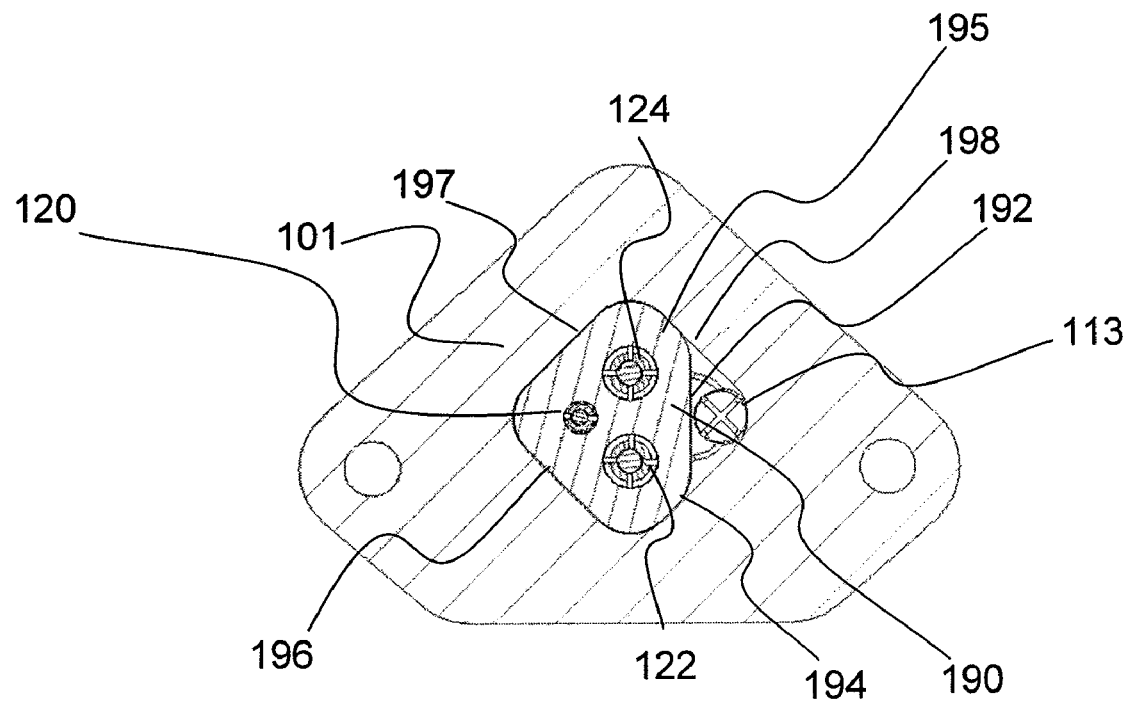
FIG. 7 is a lateral cross section view of the EOC junction box assembly illustrated in FIG. 5 when viewed along the view line 7-7 of FIG. 5.

FIGS. 6-8 are lateral cross section views of the EOC junction box assembly 100 illustrated in FIG. 5 when viewed along the view lines 6-6, 7-7 and 8-8, respectively, of FIG. 5.

Thus, as illustrated in FIGS. 6-8, the interior configuration of the EOC junction box assembly 100 is non-uniform and aids to ensure that components included in the EOC junction box housing 101 do not rotate following assembly of the EOC junction box assembly 100.

FIG. 6 is a lateral cross section view of the EOC junction box assembly 100 illustrated in FIG. 5 when viewed along the view line 6-6 of FIG. 5. As shown in FIG. 6, the EOC receptacle plug 105 includes apertures 106-108 positioned to interface with female/female connectors 120, 122, 124 (illustrated in FIG. 7). That EOC receptacle plug 105 is positioned within the interior of the EOC junction box housing 101 with the assistance of the EOC junction box cover 130 (not shown in FIG. 6) which is affixed to the EOC junction box housing 101 by the screws 135.

Likewise, FIG. 7 is a lateral cross section view of the EOC junction box assembly 100 illustrated in FIG. 5 when viewed along the view line 7-7 of FIG. 5. As shown in FIG. 7, the female/female connectors 120, 122, 124 are positioned so as to interface with the apertures 106-108 of the EOC receptacle plug 105. Note the back or interior end 190 of the EOC receptacle plug 105 is illustrated. That end 190 is substantially square in shape but includes a flattened corner 192 that alters the shape of the end 190 to be somewhat similar to the EOC fitting 115 illustrated in FIGS. 12-13 for reasons discussed herein.

Figure 14:
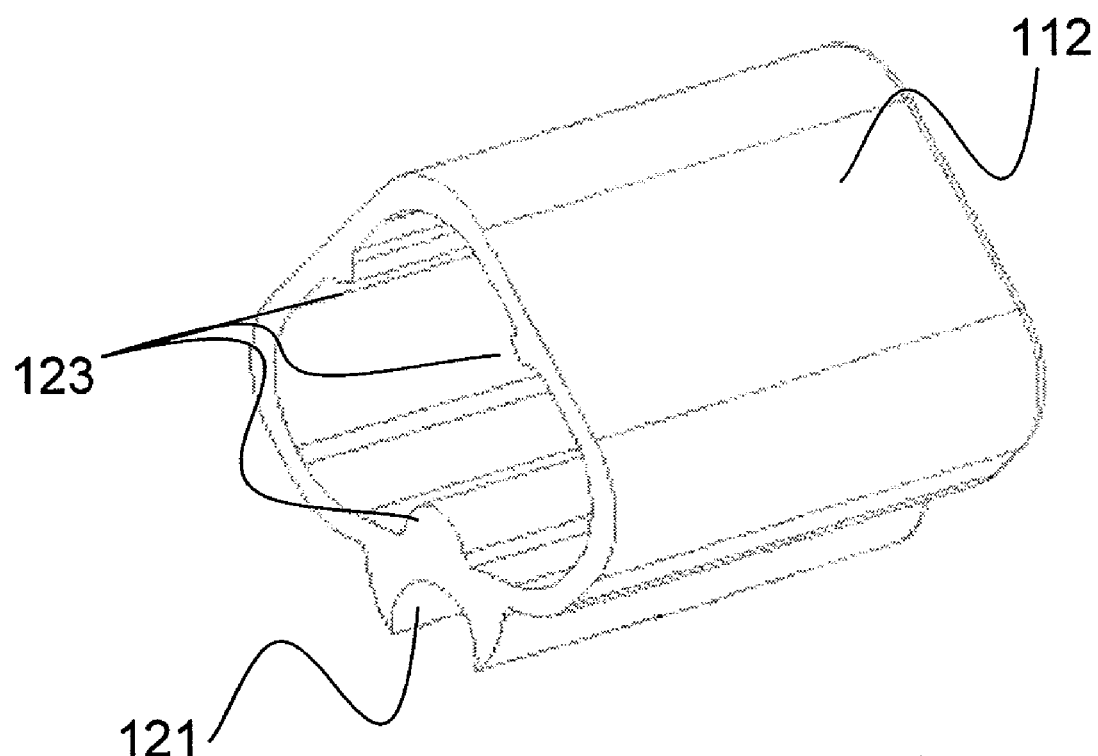
FIG. 14 illustrates a perspective view of the sleeve provided in at least one embodiment of the invention.

Also, as can be seen in FIG. 7, the ground pin 113 is positioned within the recess 121 of the sleeve 112. This cooperation between the sleeve 112 and the ground pin 113 assists in preventing accidental dislodging of the male contact pins from the EOC fitting by vibration. In this configuration, the ground pin 113 will also serve as a ground for the EOC junction box assembly 100. Additionally, such a sleeve 112 and ground pin 113 may assist in ensuring that, if the male contact pins become partially dislodged, the pins do not come into electrical contact with the wall of the housing. Sleeve 112 may be, for example, a sleeve-like component sized to provide a relatively thin sleeve surrounding EOC fitting 115, as shown in FIG. 14 and described herein.

FIG. 8 is a lateral cross section view of the EOC junction box assembly 100 illustrated in FIG. 5 when viewed along the view line 8-8 of FIG. 5. As shown in FIG. 8, the male contact pins 125, 127, 129 are likewise positioned via the EOC fitting 115 so as to interface with the female/female connectors 120, 122, 124. As shown in FIG. 8, the male contact pins 125, 127, 129, are respectively positioned in openings 200, 202, 204 of differing sizes within the EOC fitting 115. As mentioned above, the EOC fitting 115 is shaped very similar to the end 190 of the EOC receptacle plug 105. Thus, the EOC fitting 115 is shaped like a square but includes a flattened corner 114 that is flattened like flattened corner 192 and includes indentations configured to receive and interface with the protrusions 123 of the sleeve 112. The other sides of the EOC fitting 115 include sides 116, 117, 118, 119 may include such indentations as well.

As further illustrated in FIG. 8, the interior material 103 of the EOC junction box housing 101 includes a cavity 104 that is substantially square in shape as well.

Figure 10:
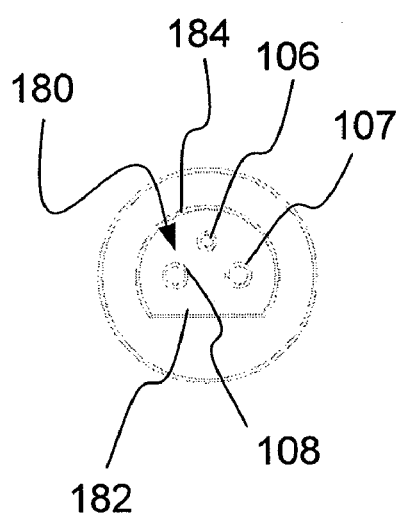
FIG. 10 illustrates a front view of the EOC receptacle plug illustrated in FIG. 9.

Additional details are now provided regarding the EOC receptacle plug 105 illustrated in FIGS. 1-7. FIG. 9 illustrates a perspective view of an EOC receptacle plug 105 utilized in the EOC junction box assembly 100 illustrated in FIG. 1. Likewise, FIGS. 10-11 illustrate the front and rear ends 180, 190, respectively, of the EOC receptacle plug 105.

As shown in FIG. 1, and as mentioned above, the EOC receptacle plug 105 has a non-circular shape 180 including both a flat portion 182 and a circular portion 184. The EOC receptacle plug 105 cooperates and mates with an aperture in the EOC junction box housing 101. That aperture has a corresponding non-circular shape (not shown) such that rotation of the EOC receptacle plug 105 within the aperture is retarded or prevented by the non-rotating shapes.

As shown in FIG. 11, the rear end 190 of the EOC receptacle plug 105 has a substantially-triangular shape, resulting from the square shape with one flattened corner 192 provided in a similar manner as the non-circular shape of the front end 180. More specifically, as indicated in FIGS. 10 and 11, the flattened portions 182 and 192 of the substantially circular end 180 and substantially square end 190 of the EOC receptacle plug 105 are provided in the same general location as one another, i.e., they have the same orientation. Accordingly, it should be understood that if the EOC junction box assembly 100 is assembled with the flat portion 182 of the "D" shape 180 downward, then the flattened portion of the substantially square shape on the rear end 190 of the EOC receptacle plug 105 will also be provided in that same orientation.

However, in accordance with the illustrated invention, the EOC fitting 115 cooperates with the interior cavity 103 of the EOC junction box housing 101 (as illustrated in FIG. 8) and the other components included in the EOC junction box assembly 100 (as illustrated in FIGS. 5-8) such that the orientation of the "D" shaped EOC receptacle plug 105 may be altered by 90 degrees without affecting the orientation required for EOC junction box housing 101. Accordingly, as illustrated in FIG. 9, the end 190 of the EOC receptacle plug 105 is substantially square in shape but includes a flattened corner 192 that alters the shape of the end 190 to be somewhat similar to the EOC fitting 115 illustrated in FIGS. 12-13 for reasons discussed herein. Additionally, as explained herein, the interior cavity 104 of the EOC junction box housing 101 is shaped so as to interact with the EOC fitting 115 such that four alternative square shaped plug configurations, 90 degrees rotated from one another may be provided during assembly. Likewise, it should be understood that the EOC receptacle plug 105 also has four alternative positions rotated from one another by 90 degrees.

Figure 12:
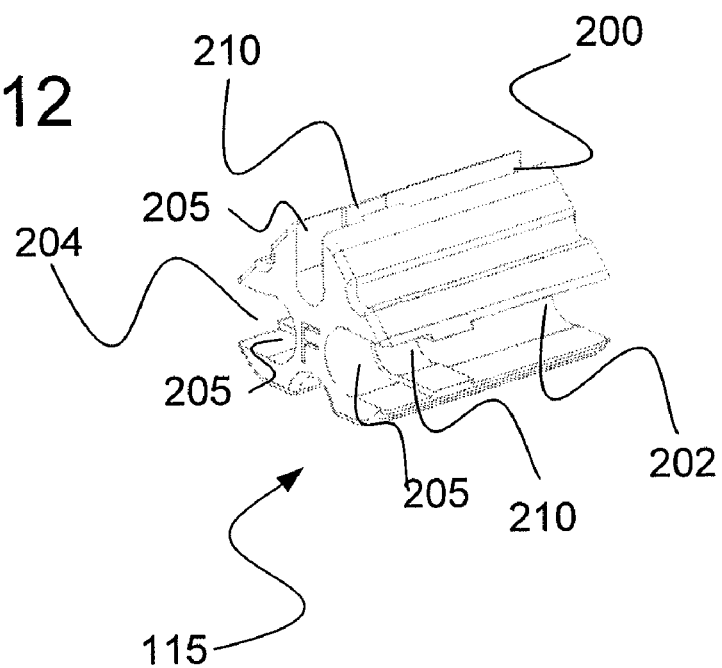
FIG. 12 illustrates a perspective view of an EOC fitting incorporated in the EOC junction box assembly illustrated in FIG. 1.

More specifically, as illustrated in FIG. 12, the EOC fitting 115 is shaped substantially in a triangular manner, which may be alternately viewed as a substantially square shape with a flattened side in the same manner as the end 190 of the EOC receptacle plug 105. In the EOC fitting 115, the corners of the triangle may be replaced with slot apertures 200, 202, 204 (also illustrated in FIG. 8) that span the entire length of the EOC fitting 115. Thus, as illustrated, the EOC fitting includes three slot apertures 200, 202, 204 of varying sizes corresponding to the various sizes of the male contact pins 125, 127, 129. Thus, the slot apertures 200, 202, 204 are shaped, positioned and sized to receive the three male contact pins 125, 127, 129, respectively. The EOC fitting 115 may be configured so that each of the male contact pins 125, 127, 129 may simply snap into place within each of the slot apertures 200, 202, 204.

As illustrated in FIG. 12, the slot apertures 200, 202, 204 may also include a smaller diameter region 210 provided to accommodate a smaller diameter portion of the male contact pins 125, 127, 129 to ensure that the male contact pins 125, 127, 129 do not move laterally along the slot apertures 200, 202, 204.

The male contact pins 125, 127, 129 may then provide connection with the pins or sockets (not shown) crimped onto a trainline (not shown) that may be fed through the rear end of the EOC junction box housing 101. To that end, it should be appreciated that the male contact pins 125, 127, 129 may include female contact sockets on one end for receiving male contact pins crimped on a trainline; alternatively, the male contact pins 125, 127, 129 may include male contact pins on both ends so as to enable mating with female contact sockets crimped on a trainline.

The "D" shaped non-circular shape 180 of the EOC receptacle plug 105 may be rotated at 90 degree intervals to enable different configurations of the "D" shaped plug with relation to the EOC junction box housing 101. Thus, FIG. 1 illustrates only one configuration of the EOC junction box assembly 100; in another configuration, the flat end of the "D" shape may be provided on the opposite lateral side of EOC junction box assembly 100. Such an alternative configuration can be of potential utility when trainline connections are easiest coupled or uncoupled from one lateral side, top or bottom of the connection or connections are more easily initiated or maintained from one or another lateral side of the connection or the top or bottom of the connection.

Thus, inside the EOC junction box housing 101, the EOC fitting 115 may be rotated 90 degrees during assembly. This flexibility is a result of the configuration of the EOC fitting 115 in relationship to the back end 190 of the EOC receptacle plug 105 and the symmetrical nature of both the EOC fitting 115 and the inside of the EOC junction box housing 101. Additionally, as explained herein, a sleeve 112 of similar shape to the EOC fitting 115 and end 190 may also be included in the EOC junction box housing 101.

Figure 13:
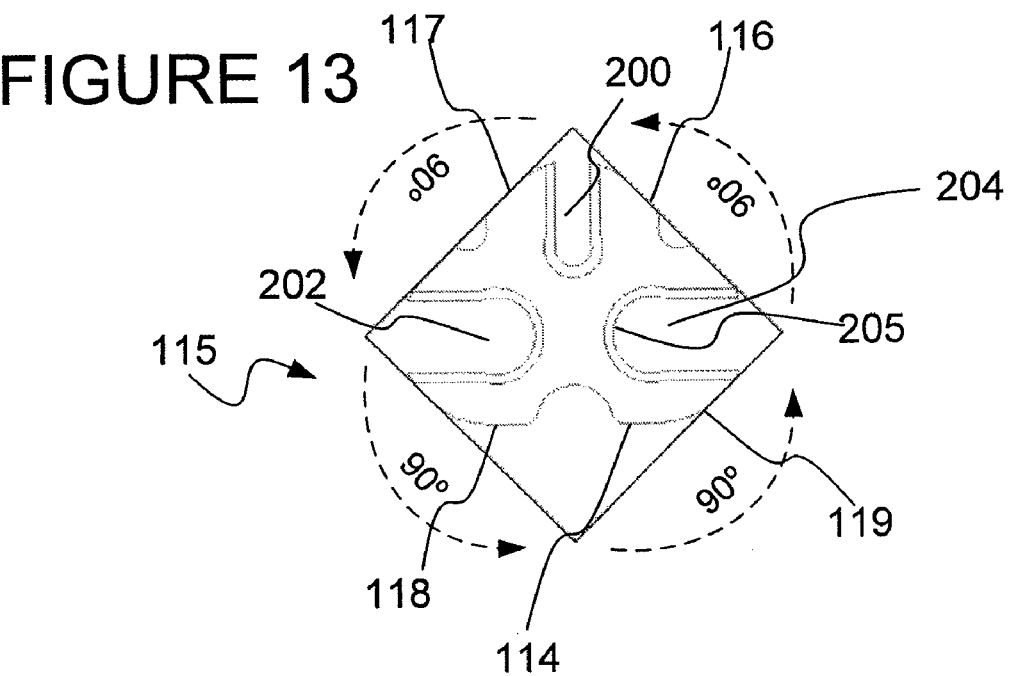
FIG. 13 illustrates an end view of the EOC fitting illustrated in FIG. 12.

Depending on the orientation of the EOC fitting 115, e.g., as illustrated in FIGS. 12-13, or upside down, the flat portion 182 of the "D" shape 180 of the EOC receptacle plug 105 may be provided as shown in FIG. 10, or rotated 90, 180 or 270 degrees, without affecting the positioning of the EOC junction box housing 101 of the EOC junction box assembly illustrated in FIG. 1.

To aid in the understanding of this potential rotation, FIG. 13 includes a dashed line indicating the orthogonal or square nature of the EOC fitting 115. Thus, the EOC fitting 115 may be rotated at 90 degree increments without altering the orientation of the EOC junction box housing 101. As shown in FIGS. 12 and 13, the slot apertures 200, 202, 204 may also optionally include enlarged ends 205 that facilitate installation of the male contact pins 125, 127, 129.

Assembly of the EOC junction box assembly 100 is fairly straight forward and involves pressing the female/female contact sockets 120, 122, 124 into the apertures 106, 107, 108 on the back side 190 of the EOC receptacle plug 105 and inserting that combination within the interior cavity 104 of the EOC junction box housing 101 at the desired configuration relative to the EOC junction box housing 101. Subsequently, or simultaneously, the male contact pins 125, 127, 129 may be snapped into the slot apertures 200, 202, 204 of the EOC fitting 115 and the combination inserted into the interior cavity of the sleeve 112. This combination may then be inserted in the interior cavity 104 of the EOC junction box housing 101. Accordingly, the female/female contact sockets 120, 122, 124 may be mated with the male contact pins 125, 127, 129. Subsequently, the EOC junction box cover 130 and associated seals may be added to the housing, and the EOC junction box cover 130 may be affixed to the EOC junction box housing 101 by the screws 135.

FIG. 14 illustrates one example of the sleeve 112 that may be utilized to prevent accidental dislodging of the male contact pins from the EOC fitting by vibration. As shown in FIG. 14, the sleeve 112 includes a recess 121 for interacting with the ground pin 113. This cooperation between the sleeve 112 and the ground pin 113 assists in preventing accidental dislodging of the male contact pins as well as electrical contact with the wall of the housing. The sleeve also includes protrusions 123 configured on the interior sides of the sleeve 112 and located to interact with corresponding indentations provided on the sides of the EOC fitting 115, as illustrated in FIG. 13. Additionally, such a sleeve 112 and ground pin 113 may assist in ensuring that, if the male contact pins become partially dislodged, the pins do not come into electrical contact with the wall of the housing.

Whereas the figures have shown a EOC junction box assembly typical for a specific type of EOC receptacle plug, it should be appreciated that various types of EOC receptacle plugs are well known in the art; as a result, although such plugs are not described in detail, it should be appreciated that the EOC junction box assembly 100 may be used in conjunction with various different types of plugs and, the particular physical configuration of a fitting used in the EOC junction box assembly according to the illustrated embodiments may be altered accordingly. It should also be appreciated that, in the configuration of the illustrated EOC junction box assembly 100, both the EOC fitting 115 and the EOC receptacle plug 105 may be environmentally sealed.

Although the present invention has been described and illustrated in detail, it is to be clearly understood that this is done by way of illustration and example only and is not to be taken by way of limitation. Thus, while this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention. As a result, it will be apparent for those skilled in the art that the illustrative embodiments described are only examples and that various modifications can be made within the scope of the invention as defined in the appended claims.

The invention claimed is:

1. A junction box assembly comprising:
   a junction box housing;
   an EOC receptacle plug inserted at least partially in the junction box assembly at a first end of the junction box housing;
   a plurality of female to female contact sockets with first ends mated with apertures included in the EOC receptacle plug and positioned to be mated at second ends with first ends of a plurality of corresponding male contact pins; and
   a fitting configured to receive and position the plurality of male contact pins at a second end of the junction box housing,
   wherein, the fitting is shaped such that the shape interacts with an interior configuration of the junction box housing to restrain rotation of the plurality of female-to-female contact sockets and the plurality of male-to-male pins included in the housing following assembly.

2. The junction box assembly of claim 1, wherein the plurality of male contact pins and corresponding female to female contact sockets are positioned within the junction box housing by the fitting such that alternate positions of the fitting and EOC receptacle plug are available during assembly.

3. The junction box assembly of claim 2, wherein the alternate positions are 90 degrees rotated from one another.

4. The junction box assembly of claim 2, wherein the internal configuration of the junction box housing interacts with the fitting such that the fitting may be rotated in 90 degree increments to provide the alternative positions of the EOC receptacle plug.

5. The junction box assembly of claim 1, wherein the plurality of male contact pins snap into corresponding slot apertures included in the fitting during assembly of the junction box assembly.

6. The junction box assembly of claim 1, further comprising the plurality of male contact pins corresponding to and mated with the female to female contact sockets.

7. The junction box assembly of claim 6, wherein the plurality of male contact pins snap into corresponding slot apertures included in the fitting during assembly of the junction box assembly.

8. The junction box assembly of claim 1, wherein the exterior of the junction box housing is triangular in shape.

9. The junction box assembly of claim 1, wherein the fitting includes a plurality of slot apertures each configured to receive a corresponding male contact pin.

10. The junction box assembly of claim 9, wherein each of the slot apertures includes a region of smaller diameter for interfacing with a corresponding male contact pin portion of smaller diameter.

11. The junction box assembly of claim 1, wherein the junction box assembly is an end of car junction box assembly.

12. The junction box assembly of claim 1, wherein the plurality of male contact pins includes three male contact pins.

13. The junction box assembly of claim 1, wherein the plurality of female to female contact sockets includes three female to female contact sockets.

14. The junction box assembly of claim 1, wherein both the fitting and the EOC receptacle plug are weather-resistant sealed by the junction box housing.

15. The junction box assembly of claim 1, further comprising a sleeve configured to receive and interact with the fitting such that electrical contact between the male contact pins and the junction box housing is prevented.

16. The junction box assembly of claim 15, further comprising a ground pin configured to be positioned within an indentation on an outer side of the sleeve.

17. The junction box assembly of claim 1, further comprising a junction box cover positioned at the end of the junction box housing proximate to the EOC receptacle plug, the cover including an aperture shaped to receive one end of the EOC receptacle plug such that the EOC receptacle plug is accessible to mate with a trainline.

18. The junction box assembly of claim 1, wherein the plurality of male contact pins are crimped onto an electrical trainline within a rail car prior to mating of the plurality of male contact pins with the corresponding female to female contact sockets.

19. The junction box assembly of claim 1, wherein the female to female contact sockets are pressed into apertures included the EOC receptacle plug.

* * * * *